(12) United States Patent
Shirakawa

(10) Patent No.: US 6,416,233 B2
(45) Date of Patent: *Jul. 9, 2002

(54) OPTICAL FIBER CONNECTOR

(75) Inventor: Tsuguhito Shirakawa, Shizuoka (JP)

(73) Assignee: Yazaki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/295,521

(22) Filed: Apr. 21, 1999

(30) Foreign Application Priority Data

Apr. 24, 1998 (JP) .......................................... 10-115008

(51) Int. Cl.[7] .................................................. G02B 6/36

(52) U.S. Cl. ........................................... 385/60; 385/78

(58) Field of Search ............................. 385/60, 67, 70, 385/72, 78

(56) References Cited

U.S. PATENT DOCUMENTS

| 5,224,186 A | * | 6/1993 | Kishimoto et al. ........... 385/78 |
| 5,418,874 A |   | 5/1995 | Carlisle et al. |
| 5,809,192 A | * | 9/1998 | Manning et al. .............. 385/78 |
| 5,946,436 A | * | 8/1999 | Takashi ........................ 385/60 |

FOREIGN PATENT DOCUMENTS

| EP | 0034987 A | 9/1981 |
| GB | 2054893 A | 2/1981 |
| GB | 2062283 A | 5/1981 |
| JP | 7-218764 | 8/1995 |

\* cited by examiner

Primary Examiner—Frank G. Font
Assistant Examiner—Michael P Mooney
(74) Attorney, Agent, or Firm—Armstrong, Westerman & Hattori, LLP

(57) ABSTRACT

In an optical connector, a ferrule accommodated in a ferrule chamber of a housing is urged by a spring so that the optical connector is coupled with a complementary connector. The housing is provided with a means for stopping the retracting of the ferrule when the ferrule retracts by a certain length. In this configuration, a break in communication occurs even when force is applied to an optical fiber cable.

5 Claims, 4 Drawing Sheets

OPTICAL FIBER CONNECTOR

BACKGROUND OF THE INVENTION

1. Field of the Invention

The present invention relates to an optical fiber connector.

2. Description of the Related Art

Now referring to FIGS. 4 and 5, an explanation will be given of a prior art optical fiber connector. FIG. 4 is an exploded perspective view of the prior art connector. FIG. 5 is a sectional view thereof.

As seen from FIGS. 4 and 5, a ferrule 12 with an optical fiber mounted is accommodated in a housing.

A convex member 13 is provided on the outer periphery of the ferrule 12. An auxiliary cover 14 is engaged with the rear end of the housing 17. A spring 15 is provided between the convex member 13 and the auxiliary cover 14. The ferrule 12 is urged in a direction of coupling the pertinent optical connector with a complementary connector.

The housing 17 is provided with a protruding wall on its inner periphery. The convex member 13 is kept in contact with the protruding wall 16 so that the ferrule 12 is prevented from coming off from the housing 17.

Specifically, the ferrule 12 is accommodated in the housing so that it can move so as to be coupled with a complementary connector. In connector coupling, the ferrule of the connector at issue is brought into contact with the tip of the ferrule of the complementary connector, thereby reducing optical loss.

In such a conventional optical fiber connector, when the optical fiber 11 is touched with a hand, it will be pulled. Thus, the ferrule 12 attached to the tip of the optical fiber retracts. As a result, a gap may be produced between the complementary connector and the ferrule to increase the optical loss leading to a break of communication.

In order to avoid such a break in communication, the optical fiber connector as shown in FIGS. 6 and 7 has been proposed in JP-A-7-218764.

As seen from FIGS. 6 and 7, an optical fiber 21 provided with a ferrule 22 is accommodated in its bent state within a housing 23, and the optical fiber 21 is secured by a wedge 24 attached to an auxiliary cover 25 engaged with the rear end of the housing 23. In this configuration, when force is applied to the optical fiber connector 20, the optical fiber 21 will not retract.

However, the optical fiber connector proposed in the publication is very complicate in structure. This leads an increase in the number of components, a rise in cost and an increase in the number of man-hours.

SUMMARY OF THE INVENTION

An object of the present invention is to provide an optical fiber connector which is simple in structure and does not give rise to a break in communication when force is applied.

In order to attain the above object, in accordance with the present invention, there is provided an optical fiber connector comprising: a housing having a ferrule chamber;

a ferrule having an optical fiber and accommodated in the ferrule chamber; a spring attached to the optical fiber in the ferrule chamber, for urging the ferrule so to be coupled with a complementary connector; and stopping means for stopping the ferrule from retracting when it retracts by a prescribed length.

Since the stopping means for stopping the ferrule from retracting when it retracts by a prescribed length is provided in the housing, even when force is applied to the optical fiber, optical loss does not increase, thereby preventing a break in communication.

Preferably, said prescribed length is within a range where said ferrule is kept in contact with the complementary connector when the ferrule retracts. In this configuration, an increase in the optical loss can be removed.

Preferably, said stopping means includes a convex member formed on the outer periphery of the ferrule and a securing piece formed in the ferrule chamber and to be engaged with the convex member.

In this configuration, the retracting of the ferrule can be easily stopped.

Preferably, said securing piece is formed so as to cut a ]-shape slit in a side wall of the ferrule chamber and comprises a protrusion attached to its tip and to be brought into contact with the convex member.

In this configuration, the ferrule can be easily accommodated in the ferule chamber.

Preferably, the convex member prevents the ferrule from being coming off from the ferrule chamber in engagement with a protrusion formed on an inner wall of the housing.

In this configuration, the shape of the ferrule can be simplified.

Preferably, said stopping means stops the ferrule from retracting when the ferrule retracts until the spring reach a compression limitation corresponding to the prescribed length.

In this configuration, a break in communication can be avoided through a simple structure.

Preferably, said prescribed length can be adjusted by a diameter of the spring.

Therefore, the prescribed length can be easily adjusted.

The above and other objects and features of the present invention will be more apparent from the following description taken in conjunction with the accompanying drawings.

DESCRIPTION OF THE PREFERRED EMBODIMENTS

Figure 1:
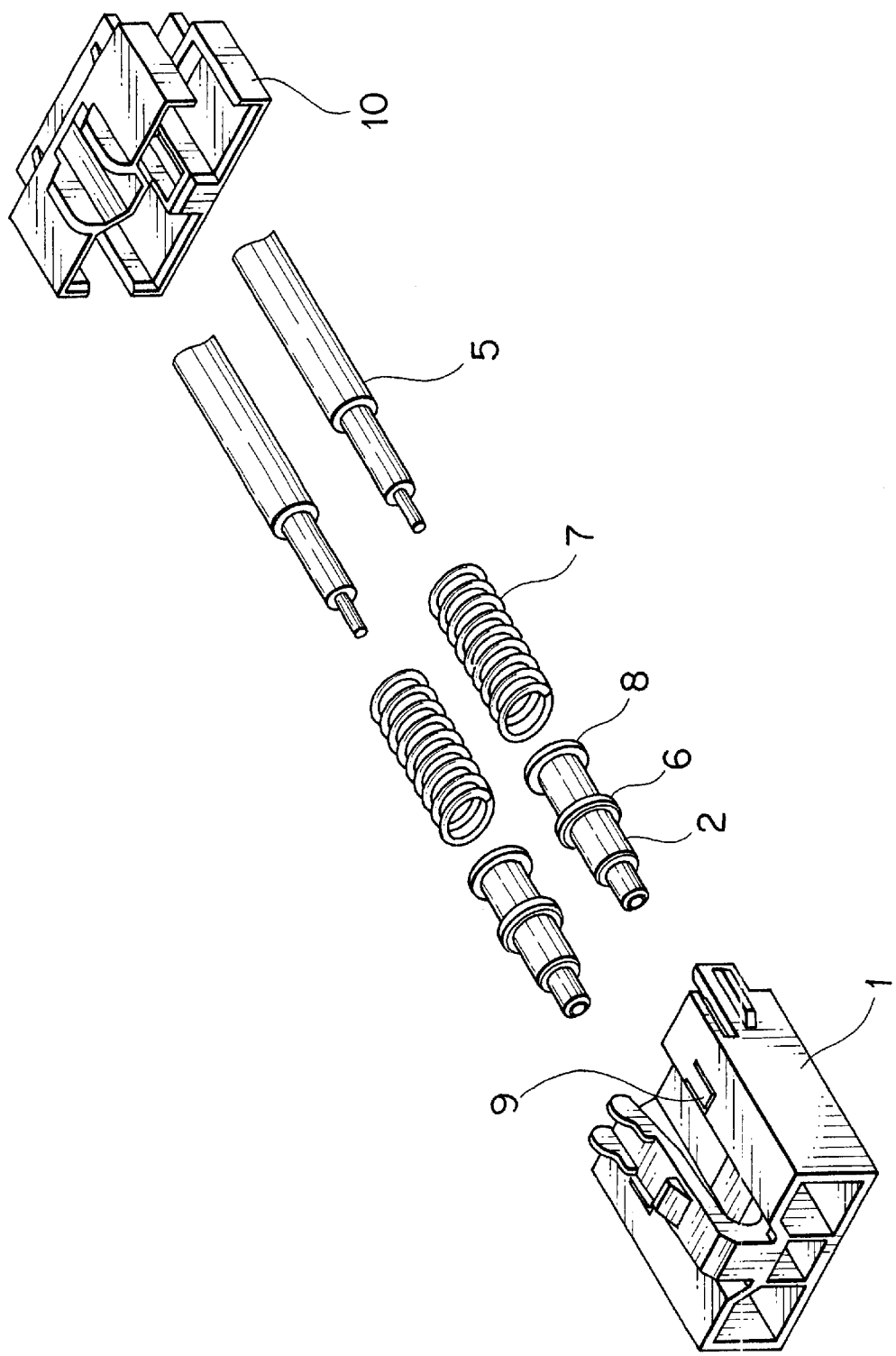
FIG. 1 is an exploded perspective view of a first embodiment of the present invention.

Now referring to FIGS. 1 and 2, an explanation will be given of an embodiment of the present invention. FIG. 1 is an exploded perspective view of the first embodiment of the present invention, and FIG. 2 is a sectional view of the embodiment.

Figure 2:
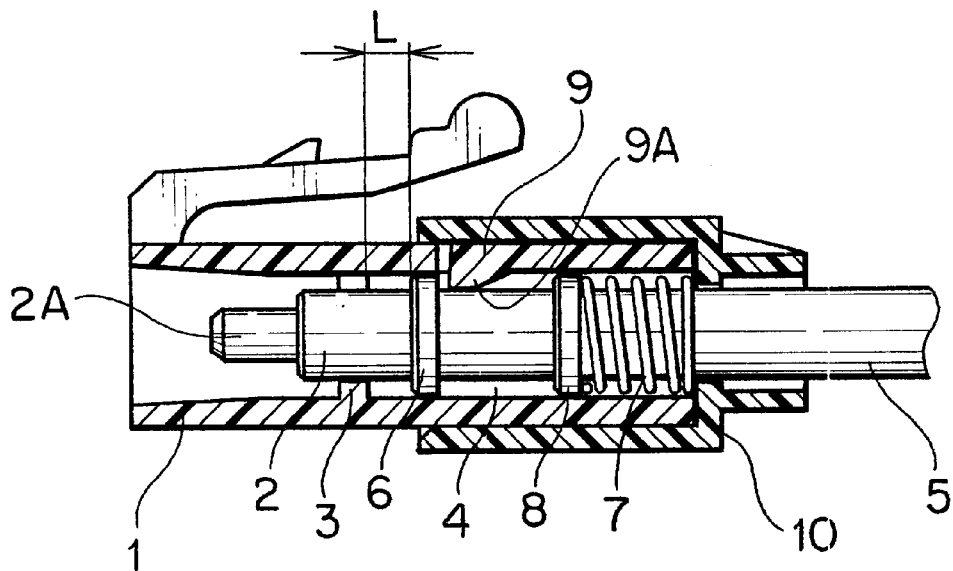
FIG. 2 is a sectional view of the first embodiment of the present invention.

In FIGS. 1 and 2, a housing 1 is provided with a protrusion 3 on its inner periphery so that a ferrule 2 is prevented from coming off from the housing 1. The protrusion 3 and an auxiliary cover 10 constitute a ferrule chamber 4.

A convex member 6 is provided on the outer periphery of the ferrule 2. The convex portion 6 is brought into contact with the protrusion 3 to prevent the ferrule 2 from coming of f from the housing 1. The ferrule 2 is provided with a flange 8 at its rear end. A spring 7 is provided between the flange 8 and the auxiliary cover 10. The ferrule 2 is urged in the direction of coupling the pertinent optical connector with a complementary connector.

The side wall of the ferrule chamber 4 is cut like a ]-shape slit to form a securing piece 9 (FIG. 1). The securing piece 9 is provided with a protrusion 9A at its tip. The protrusion 9A is brought into contact with the convex member 6 to stop the retract of the ferrule 2.

In FIG. 2, the protrusion 9A is formed within a range where the tip 2A of the ferrule 2 is kept in contact with that of a complementary connector 2 even when the ferrule 2 retracts by a distance L from the coupling state.

Figure 3:
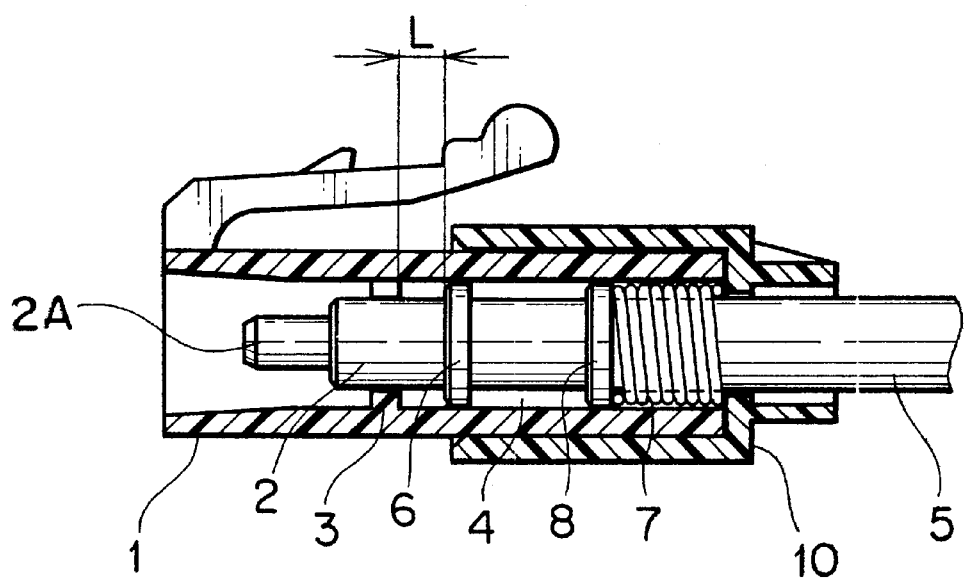
FIG. 3 is a sectional view of the second embodiment of the present invention.
Figure 4:
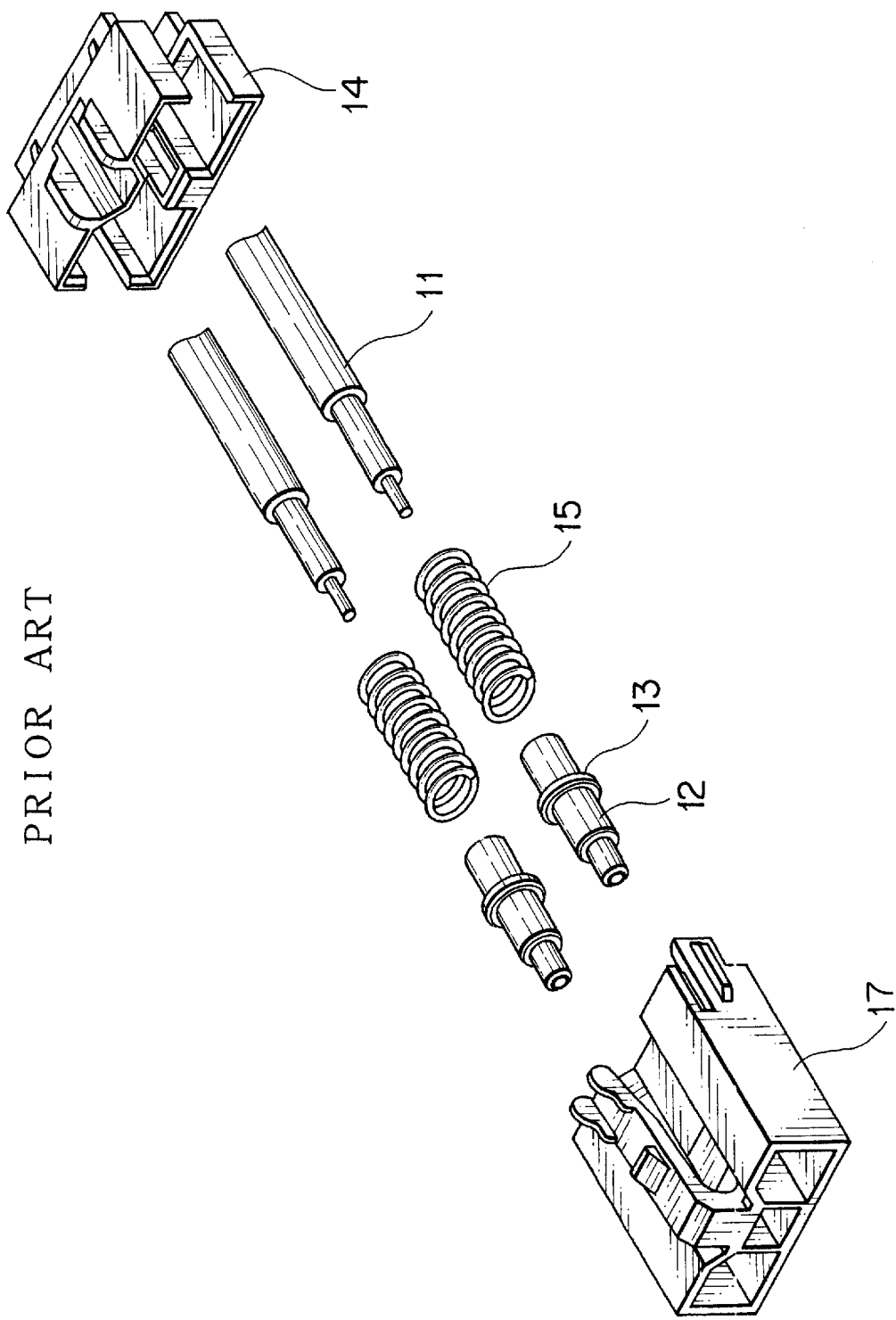
FIGS. 4 and 5 are an exploded perspective view and a sectional perspective view of a conventional optical fiber connector, respectively.
Figure 5:
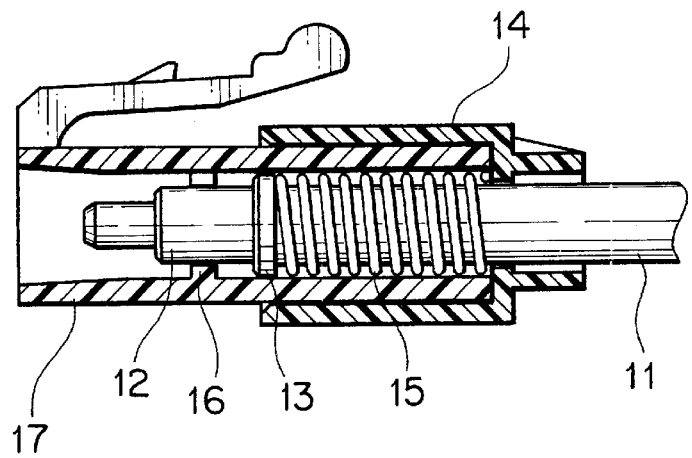
Figure 6:
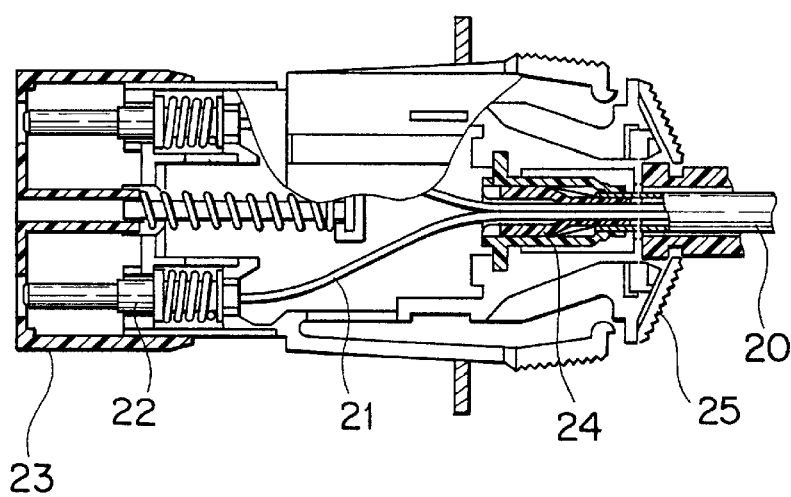
FIGS. 6 and 7 are a sectional view and an enlarged sectional view of the main part of another conventional optical fiber connector, respectively.
Figure 7:
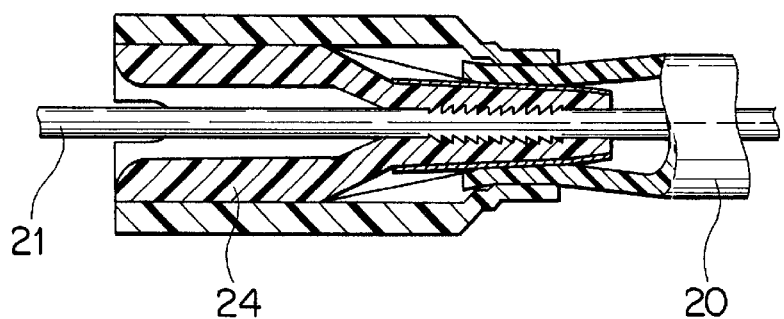

Referring to FIG. 3, an explanation will be given of a second embodiment of the present invention.

In the first embodiment, the retracting of the ferrule 2 is stopped by the securing piece 9. On the other hand, the second embodiment is different from the first embodiment in that the retracting of the ferrule is stopped by the length of the ferrule chamber 4 itself.

Specifically, when the ferrule 2 retracts because of application of force to the optical fiber 5, the spring 7 is compressed. However, when the spring 7 reaches the compression limit, the retracting of the ferrule 2 is stopped.

Therefore, as shown in FIG. 3, the length of the ferrule chamber 4 is set at such a value that the spring 7 reaches the compression limit when the ferrule 2 retracts by a length L. The length L can be adjusted by the diameter of the spring 7.

What is claimed is:

1. An optical fiber connector comprising:

a housing having a protrusion on an inner periphery of an inner wall thereof, and an auxiliary cover to constitute a ferrule chamber;

a ferrule having an optical fiber and accommodated in the ferrule chamber, said ferrule having a flange on a rear end thereof and a convex portion provided on an outer periphery of the ferrule and spaced from said flange;

a spring attached to the optical fiber in the ferrule chamber and provided between the flange and the auxiliary cover, for urging the ferrule so to be coupled with a complementary connector; and stopping means comprised of said convex portion of the ferrule and said protrusion of said housing for stopping the ferrule from retracting when it retracts by a prescribed length.

2. An optical fiber connector according to claim 1, wherein said prescribed length is within a range where said ferrule is kept in contact with the complementary connector when the ferrule retracts.

3. An optical fiber connector according to claim 1, wherein said stopping means includes a convex member formed on the outer periphery of the ferrule and a securing piece formed in the ferrule chamber and to be engaged with the convex member.

4. An optical fiber connector according to claim 3, wherein said securing piece is formed so as to cut a ]-shape slit in a side wall of the ferrule chamber and comprises a protrusion attached to its tip and to be brought into contact with the convex member.

5. An optical fiber connector according to claim 3, wherein said convex member prevents the ferrule from being coming off from the ferrule chamber in engagement with a protrusion formed on an inner wall of the housing.

* * * * *